United States Patent [19]

Schelkmann et al.

[11] 4,151,027

[45] Apr. 24, 1979

[54] METHOD FOR THE RENEWAL OF A WORN PNEUMATIC OR SOLID RUBBERY TIRE BY APPLYING A VULCANIZED TREAD AND APPARATUS CARRYING OUT THIS METHOD

[75] Inventors: Wilhelm Schelkmann; Gerda Schelkmann, nee Werner, both of Witten, Fed. Rep. of Germany Germany

[73] Assignee: Vakuum Vulk Holdings Limited, Nassau, The Bahamas

[21] Appl. No.: 821,731

[22] Filed: Aug. 4, 1977

[30] Foreign Application Priority Data

May 16, 1977 [DE] Fed. Rep. of Germany ....... 2722134

[51] Int. Cl.$^2$ ................. B29H 5/04; B29H 17/36
[52] U.S. Cl. ................................. 156/96; 150/54 B; 156/285; 156/382; 156/394
[58] Field of Search ............... 156/96, 123, 126–129, 156/103–105, 156, 285–287, 381, 382, 394; 150/54 R, 54 B; 23/290; 428/68, 69, 72, 76, 493

[56] References Cited

U.S. PATENT DOCUMENTS

| | | | |
|---|---|---|---|
| 3,236,709 | 2/1966 | Carver | 156/128 |
| 3,325,326 | 6/1967 | Schelkmann | 156/128 |
| 3,743,564 | 7/1973 | Gross | 156/96 |
| 3,745,084 | 7/1973 | Schelkmann | 156/96 |
| 3,884,739 | 5/1975 | Hindin et al. | 156/96 |
| 3,917,440 | 11/1975 | Huebert | 156/96 |
| 3,933,551 | 1/1976 | Brodie et al. | 156/96 |
| 3,969,179 | 7/1976 | Foegelle | 156/96 |

Primary Examiner—John E. Kittle
Attorney, Agent, or Firm—Schuyler, Birch, Swindler, McKie and Beckett

[57] ABSTRACT

The invention relates to the retreading of rubber tires wherein a prevulcanized tread is applied to a tire carcass with an interposed vulcanizable bonding layer. The tread and at least the adjacent part of the carcass are enclosed within a close fitting flexible envelope and the resulting blank is subjected to a pressure- and heat-treatment in an autoclave to bond the tread to the carcass. The invention resides in the construction and use of an envelope which is associated with an adjacent reservoir within the autoclave, preferably between the envelope and tire, for the accumulation of possible gaseous inclusions between the inside of the envelope and the blank.

23 Claims, 8 Drawing Figures

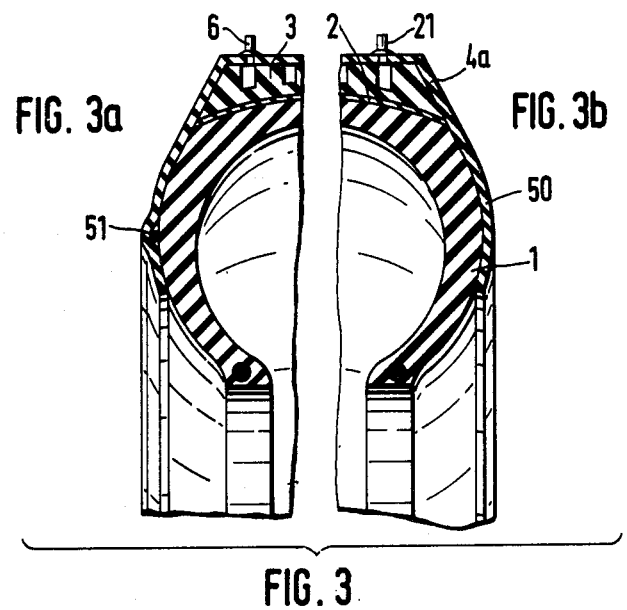
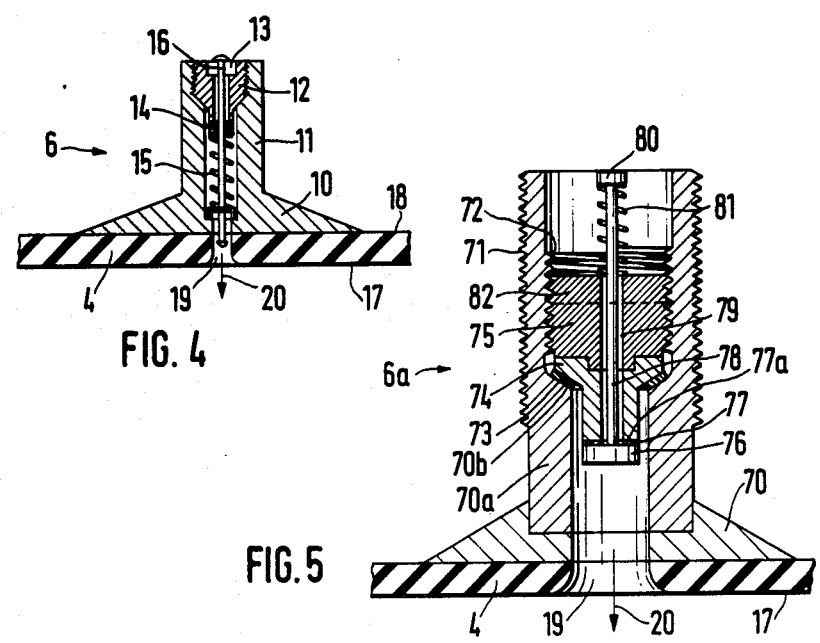

METHOD FOR THE RENEWAL OF A WORN PNEUMATIC OR SOLID RUBBERY TIRE BY APPLYING A VULCANIZED TREAD AND APPARATUS CARRYING OUT THIS METHOD

The invention refers to a method of retreading worn pneumatic or solid rubber tyres by means of a prevulcanized tread in the form of a ring or of sections of strip, segments or the like with a vulcanizable bonding sheet or other layer of binding rubber interposed, where the tread, the bonding layer and at least the adjacent part of the tyre carcass are sealed by means of an elastic rubber or other flexible envelope and the blank thus enveloped is introduced into an autoclave for a pressure-and heat-treatment. The invention is furthermore directed to a device for use in such a method.

In previous retreading methods of the foregoing kind, after introduction of the blank into the autoclave, overpressure becomes effective on the outside of the envelope and the parts of the blank in certain cases not covered by the envelope, and the envelope is connected to a hosepipe which is led from the interior to the exterior of the autoclave and serves to lead away air and other gaseous media from the space between the envelope and the blank. The hosepipes are also used in order to produce during the treatment in the autoclave only a relatively slight difference in pressure between the autoclave pressure and the pressure in the space between the envelope and the blank for the avoidance of so-called shifts of profile. The shifts of profile arise essentially by bulgings up or other deformations of the bottom layer of rubber, namely the roots of the projecting portions of the profile. Connection of the hosepipe to the envelope and running the hosepipes out of the autoclave are additional time-wasting work which must be performed with care and which hampers the handling of the blank surrounded by the envelope when putting it into the autoclave and performing the pressure-and heat-treatment. The making of the hose connections on the envelope and the provision and maintenance of the hosepipes require additional costs and form a sensitive point in the envelope system. Leaks in the connections frequently lead to stoppages in production.

The problem therefore exists of simplifying the drawing off of air and other gaseous media from the space between the blank and the surrounding envelope.

In accordance with the invention, in a method of retreading rubber tyres, the method comprising applying to a tyre carcass a prevulcanized tread with an interposed vulcanizable bonding layer, enclosing the tread and at least the adjacent part of the carcass with a close fitting flexible envelope, and subjecting the resulting blank to a pressure-and heat-treatment in an autoclave to bond the tread to the carcass, the envelope is associated with an adjacent reservoir within the autoclave whereby possible gaseous inclusions between the inside of the envelope and the blank can accumulate, at least during the heat-treatment, in the reservoir.

The invention recognizes that the method of retreading usual hitherto, employing complete or partial envelopes can be performed considerably more simply if an envelope is employed which avoids the use of long hosepipes. This is possible in accordance with the invention if the air as well as other gaseous media can, during the autoclave treatment, be led into a reservoir which makes the tyre in the autoclave independant of the outer ambient. Preferably an individual reservoir is to be associated with each tyre, so that the tyres in the autoclave are independent of one another as regards position and arrangement. In any case it is obtained in such a way that the envelope during the autoclave treatment clings right round flat against the blank.

Fundamentally, especially also in the case of repairs to the inside of the tyre, so-called complete envelopes which surround the tyre inside and out may be employed. But a so-called top or partial envelope is simpler to produce and handle, which covers over the tread, extends from there on both sides about as far as the middle of the sides of the carcass and there sealed by, for example, gluing on by means of non-vulvanizable crude rubber or by laying under it a sealing cord.

The air as well as other gaseous media between the blank and the envelope may also be led off into a separate reservoir which is formed by a chamber connected to the envelope. The chamber may be on the side or else on the periphery of the blank. As the chamber there may be employed, for example a metal ball or a flask which may be accomodated inside the tyre carcass and, in the case of the employment of a rim for supporting the carcass, inside the rim. The chamber may then have a short hose connection to the space between the envelope and the tyre.

Preferably however the space between the tread and the envelope is employed as the reservoir. This space is always available with a profiled tread that is to say as the free space, that is not filled with rubber, interstices between the profiled ribs or other projecting portions forming the real tread profile, which are bounded on the outside by the envelope. Normally this space is adequate for accepting the amounts of air to be drawn off. It amounts usually to 10–40% of the total volume of the tread. so that in the case of an average lorry type tyre a reservoir volume of about 1–4 liters is available between the profiles of the tread. Taking into consideration an autoclave pressure of 5 kg/cm$^2$, 4–16 l of air or gaseous media, referred to the original pressure conditions, can consequently be accommodated between the profiles.

If the body is provided with a profileless tread or if the space between the envelope and the tread profile is inadequate an inlay which exhibits a receiver volume may be employed as reservoir, for example, an inlay of an essentially incompressible fabric which is laid, for example, under the envelope.

Preferably drainage paths leading to the reservoir are held open underneath the envelope for the air as well as for the other gaseous media, for example, laying a fabric underneath the envelope, which forms a network of paths. Depending upon the free space within the tread profile and depending upon the shape and size of the tyre it may also be adequate at the time of or after the sealing of the envelope, in any case before introduction into the autoclave, to draw off air in such a way that the envelope lies flat against the blank, without a separate reservoir being needed for this.

It is foreseen that by the collection of the air and other gaseous media in the space between the tread profile and the envelope a pressure is formed there which opposes bulging up or other deformation of the roots of the projecting portions of the profile between the projecting portions. If, for example, in the case of particularly heavily cleated profiles it is to be expected that the amount of air led into the space between the tread profile and the envelope is not adequate, it is advantageous after the sealing of the envelope onto the blank to introduce an additional amount of air into the space between the envelope and the blank by means, for example, of a simple valve in the envelope or by raising of the edge of the envelope from the blank here and there for momentary blowing in of the additional amount of air. By doing that shifts of profile may be simply and surely avoided.

In other known methods shifts of profiles are avoidable in a very cumbersome way, for example, by laying round rubber cords into the profile, by which the latter are completely or partially filled up, or by costly bandages which surround the blank along the tread and exhibit on their inner sides a negative profile corresponding with the tread. Other known methods require the introduction of air via hosepipes into the profiles before the vulcanization in the autoclave starts. The pressure difference which can be produced in this way, that is, an only relatively slight difference in pressure in the spaces within the profile and the autoclave pressure may now, on the contrary, be achieved in a very simple way described above, in that the space within the profile is used as the reservoir and where necessary an addition amount of air is fed to the space between the envelope and the tyre before the tyre is introduced into the autoclave.

Preferably, the pressure difference necessary for the avoidance of shifts of profile is brought about in such a way that during treatment in the autoclave a pressure difference is by an overpressure valve fitted to the envelope, automatically produced between the pressure in the autoclave and the pressure in the space between the envelope and the tyre, which corresponds with the selected release over-pressure. The valve may at the same time be made use of for checking the sealing of the envelope. By means of a so-called injector which is avaliable in every tyre workshop for draining air out of tyres (injector-pump connected to compressed air piping) the air between the envelope and the tyre is as far as possible sucked out. The envelope is thereby pulled somewhat into the interstices of the profile. If this position of the envelope does not alter after a wait of about ½-hour to an hour the sealing of the envelope is adequate and the tyre may be introduced into the autoclave. As the over-pressure valve a commercial inlet valve for tyre inner tubes may if necessary be employed if the opening-pressure or release over-pressure corresponds with the desired pressure difference. The release overpressure is preferably to amount to about 1 kg/cm². If during the heat- and pressure-treatment in the autoclave pressure rises and reaches an overpressure of more than 1 kg/cm² with respect to the pressure in the space between the envelope and the tyre, the overpressure valve opens automatically and heating medium, for example, water or hot air or a stream-air mixture flows into the space between the profiles of the tread until the pressure difference is again reduced to 1 kg/cm². In this way the desired pressure difference always sets itself automatically. But depending upon the circumstances of the individual case any pressure difference fundamentally possible with the autoclave pressure may be acceptable too. If. e.g., the bottom layer of rubber is relatively thick and/or the profile ribs lie relatively close, so that shifts of profile are hardly to be feared, one may limit oneself to sucking out possible inclusions of air via, for example, a normal valve without further consideration or special adjustment of the pressure ratios.

If at the end of the pressure- and heat-treatment the autoclave pressure is reduced and the autoclave opened, because of the medium which has flowed into the space between the envelope and the tyre as a result of the overpressure prevailing there, and depending upon the pressure medium, a harmless inflation of the envelope may occur, which upon removal of the envelope automatically collapses. If a tread profile with relatively large interstices, for example, a winter profile is being used and a gaseous heating medium such as steam is being employed, automatic unloading of the overpressure in the space between the envelope and the tyre should be brought about at the end of the pressure- and heat-treatment. This may be effected, for example, in such a way that at the end of the treatment in the autoclave the pressure in the space between the envelope and the tyre is automatically reduced to correspond with the reduction in the autoclave pressure by means of an outlet valve fitted to the envelope, for example, a flap-valve which closes in the rest position and with overpressure on the outside of the envelope and opens with underpressure. Overpressure on the outside appears during the pressure-treatment in the autoclave, so that the outlet valve is then closed, whilst underpressure appears when the autoclave pressure gets reduced, so that the outlet valve opens automatically at the end of the autoclave treatment and the overpressure in the space between the envelope and the tyre is automatically unloaded.

In all of the cases described the tyres put into the autoclave for the pressure-and heat-treatment are independent of autoclave ambient. For the purpose of uniform and quicker heating through they may rotate or circulate in the autoclave.

In many cases especially where nylon bodies are employed or else when as heating medium in the autoclave hot air or steam or a steam-air mixture at above 100° C. is employed instead of water below 100° C., it may be advantageous if the blank is put on a rim with or without an inner tube under pressure, before it is introduced into the autoclave. In that case the envelope is sealed to the flange of the rim if the bead on the body is laid against the rim by the pressure inside the tyre. The tyres are put under pressure above all in order to avoid deformations of the tyre during the autoclave treatment. For this purpose a rim may be employed which can be put together from two annular halves or divided, in order to facilitate mounting. The tyre pressure must be higher than the autoclave pressure, preferably by about 1 atmosphere.

As heating medium gaseous heating media are preferred.

The invention also includes a device for use in the method in accordance with the invention, comprising a flexible envelope which is arranged to be sealed around the tread and at least the adjacent part of the carcass of a tyre to be retreaded, the envelope having no hosepipe connections and being arranged to provide in use a reservoir for the accumulation of gaseous inclusions between the envelope and tyre.

Preferably, the envelope has an overpressure valve of the kind described above for automatic production of the pressure difference necessary for the avoidance of shifts of profile and where necessary in addition an outlet valve for the purpose of reduction of the overpressure in the space between the envelope and the tyre upon letting out the autoclave pressure.

In particular for tyres, for example tyres for private cars, with a lower working pressure than 6 atmosphere gauge, it is proposed that when a rim is used to support the carcass, the pressure developed inside the carcass is automatically maintained higher than that developed in the autoclave by virtue of an over pressure valve in a branch line to the autoclave from an air pressure line to the carcass, whereby air pressure supplied to the carcass produces a lower pressure in the autoclave and when the pressure in the autoclave is released by opening of an outlet valve, the carcass is vented through the autoclave. The overpressure valve is preferably set to about 1 atmosphere. After completion of the autoclave treatment, the pressure in the tyre is thus reduced down to a value of about 1 atmosphere. For this procedure the tyres put on rims and introduced into the autoclave may be connected via hosepipes to an external central pressure main from which the autoclave pressure is also produced via the branch line which is fitted with the overpressure valve. Through the overpressure valve the pressure inside the tyre always exhibits with respect to the autoclave pressure an overpressure which corresponds with the release pressure of the overpressure valve, preferably to about 1 kg/cm$^2$. If at the end of the autoclave treatment the pressure in the autoclave is unloaded via a separate outlet valve the pressure in the tyre, with the central pressure main blocked off by means of a valve, is according to the pressure reduction at the time, unloaded into the autoclave via the branch line and the overpressure valve.

It may further be added that the hoseless envelope may also already be employed in the production of a layered construction of the blank, free of air inclusions. The tread is laid on the body which has been coated with bonding rubber, the envelope is pulled over the blank and sealed. Vacuum is via, e.g., a valve, exerted on the interior of the envelope whilst the tread is pressed on by means of rollers and meanwhile possible inclusions of air get sucked away. The blank in its envelope without hose connections is then put into the autoclave.

The invention is illustrated in greater detail by way of example in the accompanying drawing, in which:

FIGS. 3a and 3b are partial sections similar to FIG. 1 but showing the use of a top or partial envelope;

FIG. 4 is a section of an over-pressure valve;

FIG. 5 is a section of another example of an overpressure valve;

Figure 1:
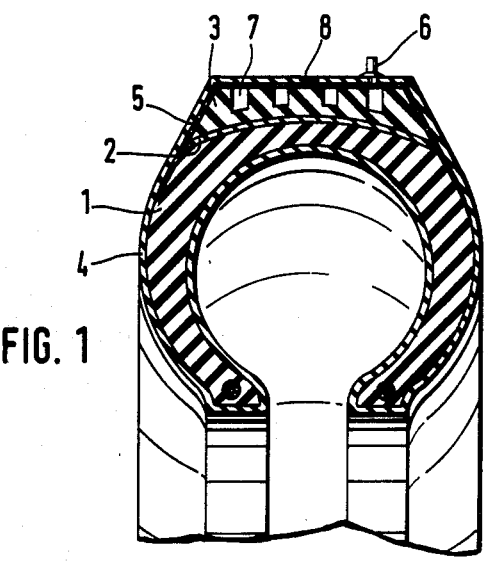
FIG. 1 is a section of part of a tyre blank enclosed within the envelope.

A tyre blank illustrated in FIG. 1 and formed from a carcass 1, a vulcanisable bonding sheet 2 and a prevulcanised tread 3 is surrounded by means of a complete resilient elastic rubber envelope 4 which surrounds the tyre outside and in.

Its edges running all round are sealed, for example, at the point designated by 8. In particular underneath the part of the envelope 4 covering the tread 3 there is an interlayer 5 of, for example, a fabric, by which drainage paths for air and other gaseous media are held open to a reservoir 7. In this embodiment the reservoir 7 is in the free interstices between the projecting ribs of the tread profile, these interstices being closed off on top by the envelope 4 or the interlayer 5. An overpressure valve 6 which reacts or opens at a pressure difference which is slightly higher than 1 kg/cm$^2$, is fitted to the envelope 4, advantageously in the region above the tread 3.

An overpressure valve 6 which can be employed for this purpose and corresponds with a commercially available construction is illustrated in FIG. 4. It exhibits a base 10 firmly connected to the envelope 4 and having a shank 11 into the outer opening of which an insert 12 is screwed. The inner end of the insert forms a valve seat and is closed in the rest position by a closure 14 through the pressure of a spring 15. The valve stem 16 which has free a port 13 extends into an opening 19 in the envelope 4, which lines up with the valve port. When the difference between the pressure acting on the outside 18 of the envelope 4 and the pressure acting on the inside 17 of it is higher than 1 kg/cm$^2$ the overpressure valve 6 opens and lets pressure medium flow in through the overpressure valve 6 in the direction of the arrow 20.

Another example 6a of an overpressure valve, illustrated in FIG. 5, acts in a similar way. A shank 70a provided with external and internal threads 71, 72 is fastened to the envelope 4 by a base 70. A threaded part 75 formed at the top as a web 82 and screwed into the shank 70a presses an insert 74 provided with a seal 73 against a seating 70b in the shank 70a to make a seal. A closer 76 on a valve stem 78 is pressed against a seat 77a at the bottom end of the insert, which is provided with a seal 77, by means of a spring 81 which is stressed between a web 80 at the top end of the valve stem 78 and the top of the threaded part 75. The spring characteristics determine the overpressure at which the valve opens and lets pressure medium flow in the direction of the arrow 20. Instead of this a commercial bicycle tyre valve may also be employed, which exhibits an opening pressure of about ½ kg/cm$^2$.

Figure 6:
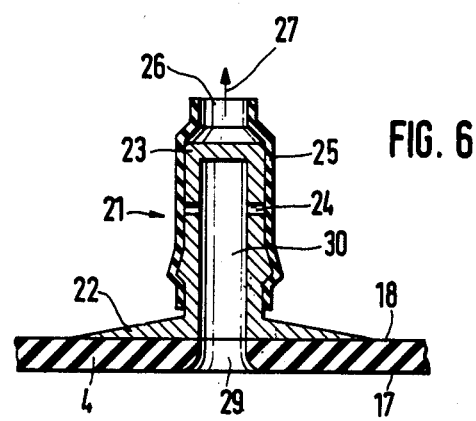
FIG. 6 is a section of an outlet valve.

To the envelope 4 in accordance with FIG. 1 an outlet valve 21 is preferably fitted too, though not shown in FIG. 1; an example of it is illustrated in FIG. 6. A base 22 firmly connected to the outside 18 of the envelope 4 exhibits a shank 23 having crossbores 24. A rubber tube 25 with a top opening 26 is pulled over the shank 23 and in the normal position of the outlet valve 21 covers the transverse crossbores 24. The opening pressure of the outlet valve 21 is determined essentially by the size and number of the crossbores 24 as well as by the wall thickness and elasticity of the rubber tube 25. Preferably the outlet valve 21 is set in such a way that it already opens at a relatively slightly overpressure on the inside 17 of the envelope 4 with respect to the pressure acting on on the outside 18, so that pressure medium can flow out via the opening 29 in the envelope 4, an internal bore 30, the crossbores 24, the gap between the rubber tube 25 fitted sideways from the shank 23 and the shank 23 as well as the opening 26, in the direction of the arrow 27.

Figure 2:
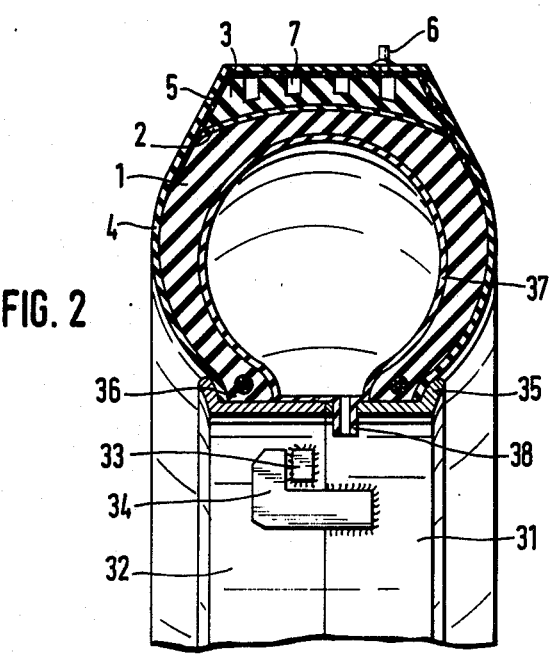
FIG. 2 is a section similar to FIG. 1, but showing a tyre supported on a rim.

The embodiment in accordance with FIG. 2 differs from that in accordance with FIG. 1 in that the tyre is put onto a rim consisting of two halves 31, 32 which are connected together in known manner by means of dogs 33 and bolts 34 which engage behind the dogs. The envelope 4 surrounding the tyre on the outside ends on both sides respectively in the region of the bead 36 on the body and is sealed between the latter and the flange 35 of the rim. A pressure tube 37 inserted in the interior of the tyre exhibits a connection 38 which extends inwards through the rim. In other respects the construction of this arrangement corresponds with that in accordance with FIG. 1.

Preferably, however, a top or partial envelope 4a corresponding with FIGS. 3a and 3b is employed which extends over the tread 3 and from there down to about the middle of the body 1 where in FIG. 3a it is pulled over a sealing ring 51 or the like and thus sealed, or in the example shown in FIG. 3b is glued to the side of the body to make a seal, for example, by means of a sticky nonvulcanizable crude rubber coating or merely a solution of it.

The possibility for valves on the envelope 4a are the same as in cases described above.

The method in accordance with the invention, explained in the preceding examples, proceeds essentially in the following manner, in which case the numerous possibilities of modification mentioned originally are to be kept out for consideration:

The layered construction of the tyre blank as illustrated consisting of the carcass 1, bonding sheet 2 and thread 3 is produced in known manner free of internal inclusions of air or the like. After the application of the underlay 5 the tyre is surrounded inside and the by the envelope illustrated in FIG. 1, sealing being effected along the point 8. For checking the sealing of the envelope air is sucked out by means of an injector pump or the like via the overpressure valves 6 or 6a, the valve stems 16 or 78 respectively being forced inwards mechanically, so that the envelope 4 or 4a is laid flat against the tyre and at the top gets pulled somewhat into the gaps between the profiles of the tread 3. If this state is maintained even after the expiry of a wait of ½-hour or 1 hour, the sealing is adequate. The tyre may now be put into an autoclave for the performance of a pressure-and heat-treatment without any hosepipes or the like leading to the outside. As soon as the autoclave pressure rises the envelope 4, if it has not already happened previously, starts to lie right round against i.e., clings to, the tyre so that air and other gaseous media lying in the space between the envelope 4 and the tyres get forced into the reservoir 7. As soon as the pressure difference between the reservoir 7 and the autoclave pressure gets higher than 1 kg/cm$^2$ the over pressure valve 6 or 6a opens and lets pressure-medium flow into the reservoir 7 until a pressure difference of maximum 1 kg/cm$^2$ is again reached. If a usual autoclave pressure of, for example, 5 atmosphere gauge has been used, a pressure of about 4 atmosphere gauge prevails in the reservoir 7. As fully explained at the beginning, undesirable shifts of profile are thereby effectively avoided.

If the autoclave pressure is reduced, for example, at the end of the pressure-and heat-treatments, so that the pressure ratios are reversed and consequently the autoclave pressure is lower than the pressure in the reservoir 7, the outlet valve 21 opens, which during the preceding treatment remained constantly closed, and releases the pressure inside the envelope 4 or 4a accordingly. The consequence of this is that when the autoclave pressure is unloaded down to the ambient pressure the pressure inside the envelope 4 or 4a is reduced too down to a negligible value, so that the tyre can be removed from the autoclave without inflation of the envelope 4 or 4a.

In principle the same method is made use of in the case of the example illustrated in FIG. 2, in which merely for the purpose of avoidance of deformations of the tyre in the autoclave an internal pressure is imparted to the tyre by means of the pressure tube 37, which is always to be in a certain ratio to the autoclave pressure. For this purpose the pressure control and pressure regulation provided for below with reference to FIG. 7 is advantageously employed.

Figure 7:
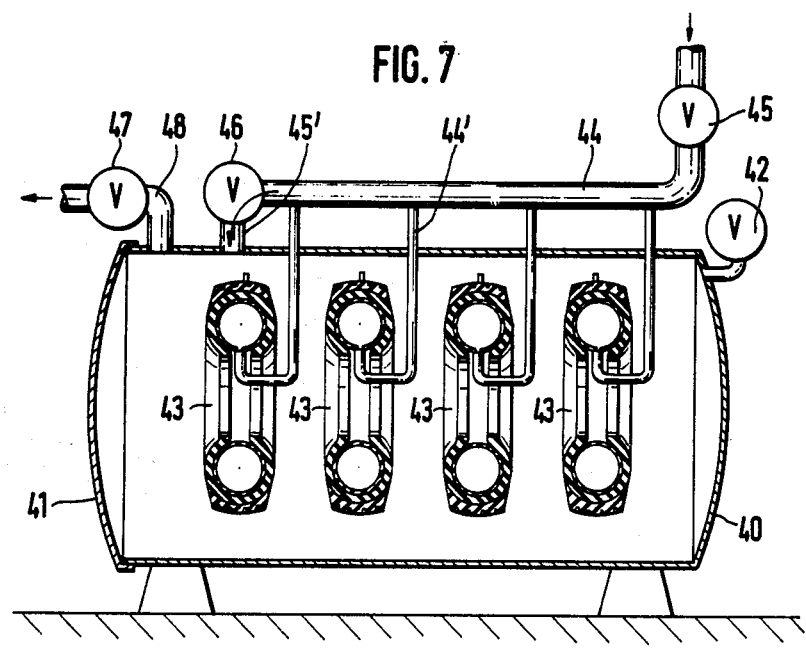
FIG. 7 is a diagrammatic side elevation of an autoclave, with tyres not on rims, and having pressure regulation and pressure control.

An autoclave 40 illustrated in FIG. 7, which exhibits a cover 41, a safety valve 42 and bearer frames (not shown) for receiving tyres 43 put on rims, is produced with a central pressure main 44 which can be blocked off by means of a valve 45 and from which corresponding connecting lines 44' are led directly to the connections (cf. 38 in FIG. 2) by means of which a corresponding inner pressure may be imparted to the tyres 43. The interior of the autoclave 40 is connected via a branch line 45' into which an overpressure valve 46 is connected, likewise to the central pressure main 44. Unloading of the autoclave pressure is performed via a discharge connection 48 provided with an outlet valve 47. If the central pressure main 44 is fed from a suitable pressure source at a pressure of, for example, 6 atmosphere gauge the valve 45 opened, a corresponding internal pressure of 6 atmospheres is imparted to the tyres 43 by way of the connecting line 44'. Compared with this the interior of the autoclave which is fed via the branch line 45' exhibits an internal pressure of 5 atmosphere gauge, if the overpressure valve 46 is set at a release pressure difference of 1 kg/cm$^2$. The build-up of the autoclave pressure in respect of the internal pressure of the tyres follows at the time too in corresponding ratio. If with the valve 45 closed the outlet valve 47 is opened and the autoclave pressure thereby reduced and also finally matched to the outerpressure, a corresponding reduction occurs in the internal pressure of the tyres. For as soon as the autoclave pressure exhibits a higher difference than 1 kg/cm$^2$ with respect to the internal pressure of the tyres the overpressure valve 46 opens and a corresponding un-loading occurs by way of the connecting lines 44', the branch line 45', the interior of the autoclave 40 and the outlet connection 48. When the autoclave pressure is matched to the ambient pressure the internal pressure in the tyres 43 is reduced to 1kg/cm$^2$.

As heating medium a gaseous medium is preferably employed such, for example, as a mixture of air and steam. Because of the automatic regulation of the pressure on the outside of the envelope 4 on the one hand and the inside of it on the other, as already explained above, in the above example a pressure appears in the reservoir of the tyres 43 of about 4 atmosphere gauge.

We claim:

1. A method of retreading rubber tyres, said method comprising applying to a tyre carcass a prevulcanized tread with a vulcanizable bonding layer interposed therebetween, enclosing said tread and at least the adjacent part of said carcass with a flexible envelope and subjecting the resulting blank comprising said carcass, tread, and bonding layer, to a pressure- and heat-treatment in an autoclave and pressing the flexible envelope in to close fit with the tread at least at the outside parts of the road engaging surface to bond said tread to said carcass, pressurizing the bottom of the interstices between the projecting portions formed in the tread profile to avoid distortions of the profiled tread during said pressure- and heat-treatment by a pressure medium of the gaseous inclusions between the envelope and said blank or the fluid of the autoclave by effecting a flow of the pressure medium between a reservoir adjacent to the tyre blank and a space formed by said close fitting envelope and the bottom of said interstices of the tread by the action of the pressure in the autoclave in the absence of conduits connecting said space or said reservoir to the outside of the autoclave.

2. A method according claim 1, wherein in the case of treads having interstices of great width and when using a corresponding high elastic enclosure a close fit of the envelope also at the bottom of the interstices of the tread is achieved by a flow of the pressure medium out of said space into a reservoir formed by a substantially incompressible chamber connected to the envelope.

3. A method according to claim 1, wherein distortions are avoided by said pressure medium enclosed in said space producing a pressure inside the envelope in the range of the maximum pressure in the autoclave.

4. A method according to claim 3, wherein to fill nearly the whole of the interstices of said tread profile with a pressure medium an additional amount of gases in introduced to said space or said reservoir before subjecting the tyre to the treatment in the autoclave.

5. A method according to claim 4, wherein a part of the fluid out of the autoclave is added to provide the pressure medium inside said space or said reservoir.

6. A method according to claim 3, wherein an inlay defining an additional reservoir made of a substantially incompressible fabric is provided between said envelope and said tread to reduce pressure in the space or reservoir.

7. A method according to claim 6, wherein said inlay provides a network of paths.

8. A method according to claim 1, wherein, during treatment in said autoclave, a certain difference between a higher pressure in the autoclave and a lower pressure between said envelope and said blank is automatically maintained by an over-pressure valve fitted to said envelope.

9. A method according to claim 8, wherein said certain pressure difference amounts to approximately 1 kg/cm$^2$.

10. A method according to claim 1, wherein, at the end of the treatment in said autoclave, the pressure between said envelope and said blank is automatically reduced to that in said autoclave by means of an outlet valve fitted to said envelope.

11. A method according to claim 10, in which said outlet valve is a flap vlave which closes when there is a higher pressure on the outside of said envelope than on the inside thereof, and vice versa.

12. A method according to claim 1, wherein said carcass is put onto a rim before it is introduced into said autoclave, and said envelope is sealed to beads of said carcass by pressure developed within said carcass under the action of which said beads on said carcass are forced against flanges of said rim with the edges of the envelope trapped therebetween.

13. A method according to claim 12, wherein said carcass is put onto a divisible rim.

14. A method according to claim 12, wherein said pressure developed within said carcass is higher than the pressure developed in said autoclave.

15. A method according to claim 12, wherein said pressure developed within said carcass is automatically maintained higher than that developed in said autoclave by virtue of an over pressure valve in a branch line to said autoclave from an air pressure line to said carcass, whereby air pressure supplied to said carcass produces a lower pressure in said autoclave, and when said autoclave pressure is released by opening of an outlet valve, said carcass is vented through said autoclave.

16. A method according to claim 15, wherein said pressure difference between said carcass and said autoclave is maintained at substantially one atmosphere.

17. A method according to claim 1, wherein a steam-air mixture is employed as a heating medium in said autoclave.

18. In a rubber tyre retreading assembly adapted to be subjected to heat and pressure in an autoclave, said assembly comprising a tyre carcass, a prevulcanized tread, a valcanizing bonding layer interposed therebetween, and a close fitting flexible envelope enclosing said tread and at least the adjacent part of said carcass; the improved envelope which is constructed as a closed cover sealing between said envelope and said tread a reservoir adapted for accumulation of gaseous inclusions between the inside of said envelope and said tread and carcass upon treatment of said assembly in said autoclave, and part of said envelope which overlies said tyre tread being provided with an over-pressure valve adapted to open when the pressure on the outside of the envelope exceeds that on the inside of said envelope by approximately 1kg/cm$^2$.

19. The invention according to claim 18, wherein said envelope is provided with an outlet valve for the venting of gas outwardly through the said envelope.

20. The invention according to claim 19, wherein said outlet valve is a flap valve which opens automatically when there is a differential pressure thereacross.

21. A flexible envelope adapted for use in the retreading of rubber tyres wherein a prevulcanized tread is applied to a tyre carcass with a vulcanizable bonding layer interposed therebetween, said tread and at least the adjacent part of said carcass being enclosed within a close fitting flexible envelope, and the resulting blank is subjected to a pressure and heat-treatment in an autoclave to bond said tread to said carcass, said flexible envelope being constructed and adapted to provide in use a sealed reservoir entirely between said envelope and said tread and carcass for the accumulation of gaseous inclusions upon said autoclave treatment, and part of said envelope adapted to overlie said tyre tread being provided with an over-pressure valve arranged to open when the pressure on the outside of said envelope exceeds that on the inside thereof by substantially 1kg/cm$^2$.

22. An envelope according to claim 21, further incorporating an outlet valve for venting of gas outwardly through said envelope.

23. An envelope according to claim 22, wherein said outlet valve is a flap valve adapted to open automatically when there is a differential pressure thereacross.

* * * * *